United States Patent
Calciu et al.

(10) Patent No.: US 12,126,534 B2
(45) Date of Patent: Oct. 22, 2024

(54) STORAGE DEVICE COMPRESSION LAYER CONGESTION CONTROL

(71) Applicant: Lenovo Global Technology (United States) Inc., Morrisville, NC (US)

(72) Inventors: Corneliu-ilie Calciu, Bucharest (RO); Radu Mihai Iorga, Bucharest (RO); Roberto H Jacob Da Silva, Oak Park, CA (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 182 days.

(21) Appl. No.: 17/491,169

(22) Filed: Sep. 30, 2021

(65) Prior Publication Data
US 2023/0096190 A1 Mar. 30, 2023

(51) Int. Cl.
*H04L 47/193* (2022.01)
*H04L 47/122* (2022.01)
*H04L 47/30* (2022.01)
*H04L 47/32* (2022.01)

(52) U.S. Cl.
CPC .......... *H04L 47/193* (2013.01); *H04L 47/122* (2013.01); *H04L 47/30* (2013.01); *H04L 47/32* (2013.01)

(58) Field of Classification Search
CPC ....... H04L 47/32; H04L 47/192; H04L 47/30; H04L 47/122
See application file for complete search history.

(56) References Cited

U.S. PATENT DOCUMENTS

| | | | | |
|---|---|---|---|---|
| 2010/0118884 A1* | 5/2010 | Hendel | ............. | G06F 15/17375 370/412 |
| 2020/0311599 A1* | 10/2020 | Chen | ...................... | G06F 3/0673 |
| 2023/0066251 A1* | 3/2023 | Trim | ................. | H04W 28/0289 |

FOREIGN PATENT DOCUMENTS

| | | | | | |
|---|---|---|---|---|---|
| CN | 103929334 | * | 7/2014 | ............. | H04L 41/06 |
| CN | 103929334 A | * | 7/2014 | ............. | H04L 41/06 |
| CN | 111526096 | * | 3/2022 | ........... | G06K 9/6222 |
| CN | 111526096 B | * | 3/2022 | ........... | G06K 9/6222 |

OTHER PUBLICATIONS

Jarle Bjørgeengen, "Using TCP/IP traffic shaping to achieve iSCI service predictability", Master Thesis, May 26, 2010, pp. 1-159, Oslo University College/USIT.

* cited by examiner

*Primary Examiner* — Jianye Wu
(74) *Attorney, Agent, or Firm* — Kunzler Bean & Adamson; Bruce R. Needham

(57) ABSTRACT

A method for storage device compression/deduplication layer congestion control includes comparing a level of congestion at a compression/deduplication layer of a storage device with a lower congestion limit. The compression/deduplication layer is configured for data compression and/or data deduplication of a data packet prior to storing data of the data packet. The data packet is received from a computing device using transmission control protocol ("TCP"). The method includes, in response to the level of congestion exceeding the lower congestion limit, marking as congested, in a flow table, a data flow between the computing device and the storage device. The flow table is shared between the compression/deduplication layer and a TCP layer of the storage device.

20 Claims, 7 Drawing Sheets

STORAGE DEVICE COMPRESSION LAYER CONGESTION CONTROL

FIELD

The subject matter disclosed herein relates to congestion control for data transmission and more particularly relates to congestion control at the compression/deduplication layer of a storage device for data transmitted to the storage device.

BACKGROUND

Transmission control protocol ("TCP") is a widely used method of transmitting data. TCP uses a variable data packet transmission window size that expands until response data packets indicate congestion or response data packets are not received before a timeout. For a particular data flow between a source and a destination, TCP continually increases a size of a data packet transmission window up to a maximum unless response data packets indicate congestion or a timeout is reached before receiving response data packets. TCP at the source device then reduces the size of the data packet transmission window to reduce congestion. Congestion control is typically applied to data flows between a client and a server with a router in between. Typically, buffer capacity of the router is used to determine congestion and both the router and the server are involved in judging congestion and responding with dropping data packets or marking response data packets. However, congestion for a data flow is not limited to capacity of buffers in a router.

BRIEF SUMMARY

A method for storage device compression/deduplication layer congestion control is disclosed. An apparatus and computer program product also perform the functions of the method. The method includes comparing a level of congestion at a compression/deduplication layer of a storage device with a lower congestion limit. The compression/deduplication layer is configured for data compression and/or data deduplication of a data packet prior to storing data of the data packet. The data packet is received from a computing device using transmission control protocol ("TCP"). The method includes, in response to the level of congestion exceeding the lower congestion limit, marking as congested, in a flow table, a data flow between the computing device and the storage device. The flow table is shared between the compression/deduplication layer and a TCP layer of the storage device.

An apparatus for storage device compression/deduplication layer congestion control includes a processor and a memory that stores program code. The program code is executable by the processor to compare a level of congestion at a compression/deduplication layer of a storage device with a lower congestion limit. The compression/deduplication layer is configured for data compression and/or data deduplication of a data packet prior to storing data of the data packet, and the data packet is received from a computing device using TCP. The program code is further configured to, in response to the level of congestion exceeding the lower congestion limit, mark as congested, in a flow table, a data flow between the computing device and the storage device. The flow table is shared between the compression/deduplication layer and a TCP layer of the storage device.

A program product for storage device compression/deduplication layer congestion control includes a computer readable storage medium storing program code. The program code is configured to be executable by a processor to perform operations that include comparing a level of congestion at a compression/deduplication layer of a storage device with a lower congestion limit. The compression/deduplication layer is configured for data compression and/or data deduplication of a data packet prior to storing data of the data packet and the data packet is received from a computing device using TCP. The program code is configured to be executable by a processor to preform operations that include, in response to the level of congestion exceeding the lower congestion limit, marking as congested, in a flow table, a data flow between the computing device and the storage device, and the flow table is shared between the compression/deduplication layer and a TCP layer of the storage device. In response to the level of congestion exceeding an upper congestion limit, the program code is configured to be executable by a processor to preform operations that include determining if the data packet meets a packet discard policy and discarding the data packet in response to determining that the data packet meets the packet discard policy.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
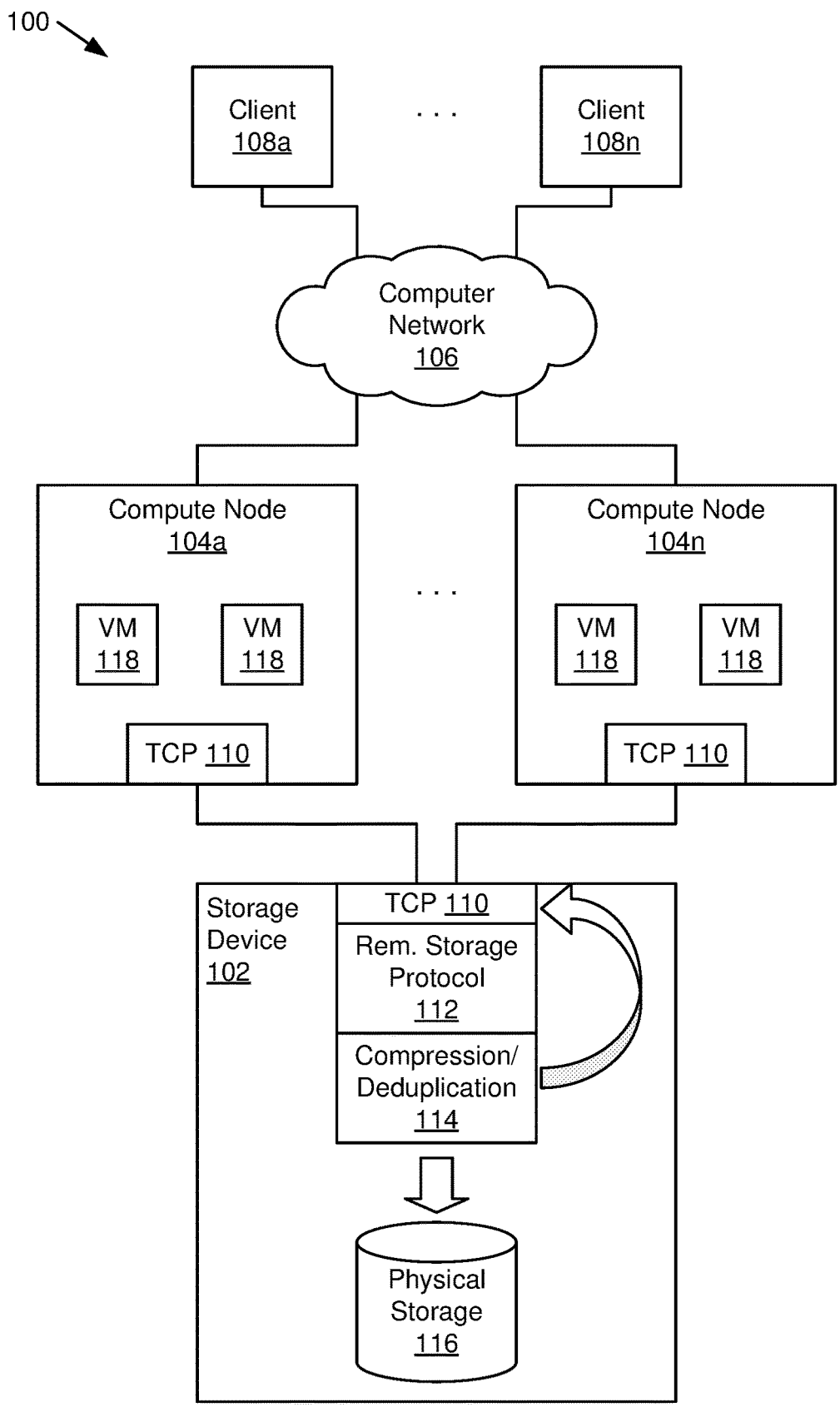
FIG. 1 is a schematic block diagram illustrating one embodiment of a system for storage device compression/deduplication layer congestion control.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory (EPROM or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for storage device compression/deduplication layer congestion control is disclosed. An apparatus and computer program product also perform the functions of the method. The method includes comparing a level of congestion at a compression/deduplication layer of a storage device with a lower congestion limit. The compression/deduplication layer is configured for data compression and/or data deduplication of a data packet prior to storing data of the data packet. The data packet is received from a computing device using transmission control protocol ("TCP"). The method includes, in response to the level of congestion exceeding the lower congestion limit, marking as congested, in a flow table, a data flow between the computing device and the storage device. The flow table is shared between the compression/deduplication layer and a TCP layer of the storage device.

In some embodiments, the method includes, in response to the level of congestion exceeding an upper congestion limit, determining if the data packet meets a packet discard policy, and discarding the data packet in response to determining that the data packet meets the packet discard policy. In further embodiments, the method includes processing the data packet for storage in response to determining that the level of congestion is below the lower congestion limit, in response to marking as congested the data flow in the flow table and determining that the level of congestion is below the upper congestion limit, and/or in response to determining that the data packet does not meet the packet discard policy. In other further embodiments, the packet discard policy is a Weighted Random Early Detection ("WRED") protocol.

In some embodiments, the compression/deduplication layer is a virtual data optimizer ("VDO") layer. In other embodiments, the level of congestion includes one or more of a level of congestion of a processor of the storage device, a number of storage requests per second, and an amount of memory utilization of memory of the storage device. In other embodiments, the compression/deduplication layer receives the data packet from a data storage protocol layer. The data storage protocol layer receives the data packet from the TCP layer of the storage device, and the data storage protocol layer processes storage device commands to physical storage in the storage device. In further embodiments, the data storage protocol layer uses an Internet Small Computer Systems Interface ("iSCSI") protocol.

In some embodiments, in response to the data flow in the flow table being marked as congested, the method includes marking a response data packet with a congestion indicator, the response data packet being sent to the computing device and includes a response to data of the data packet received from the computing device. In a further embodiment, marking the response data packet with a congestion indicator uses Explicit Congestion Notification ("ECN") protocol. In other embodiments, the flow table includes a data flow for each computing device connected to the storage device. Each data flow includes an internet protocol ("IP") address and a port for the computing device, an IP address and a port for the storage device, and an indication of whether or not the data flow is congested.

An apparatus for storage device compression/deduplication layer congestion control includes a processor and a memory that stores program code. The program code is executable by the processor to compare a level of congestion at a compression/deduplication layer of a storage device with a lower congestion limit. The compression/deduplication layer is configured for data compression and/or data deduplication of a data packet prior to storing data of the data packet, and the data packet is received from a computing device using TCP. The program code is further configured to, in response to the level of congestion exceeding the lower congestion limit, mark as congested, in a flow table, a data flow between the computing device and the storage device. The flow table is shared between the compression/deduplication layer and a TCP layer of the storage device.

In some embodiments, the program code is further executable by the processor to, in response to the level of congestion exceeding an upper congestion limit, determining if the data packet meets a packet discard policy, and discarding the data packet in response to determining that the data packet meets the packet discard policy. In other embodiments, the program code is further executable by the processor to process the data packet for storage in response to determine that the level of congestion is below the lower congestion limit, in response to marking as congested the data flow in the flow table and determining that the level of congestion is below the upper congestion limit, and/or in response to determining that the data packet does not meet the packet discard policy. In other embodiments, the packet discard policy is a Weighted Random Early Detection ("WRED") protocol. In other embodiments, the compression/deduplication layer is a virtual data optimizer ("VDO") layer. In other embodiments, the level of congestion includes a level of congestion of a processor of the storage device, a number of storage requests per second, and/or an amount of memory utilization of memory of the storage device.

In some embodiments, in response to the data flow in the flow table being marked as congested, the program code is further executable by the processor to mark a response data packet with a congestion indicator. The response data packet is sent to the computing device and includes a response to data of the data packet received from the computing device. In other embodiments, the compression/deduplication layer receives the data packet from a data storage protocol layer. The data storage protocol layer receives the data packet from the TCP layer of the storage device, and the data storage protocol layer processes storage device commands to physical storage in the storage device. In some embodiments, the data storage protocol layer uses an Internet Small Computer Systems Interface ("iSCSI") protocol.

A program product for storage device compression/deduplication layer congestion control includes a computer readable storage medium storing program code. The program code is configured to be executable by a processor to perform operations that include comparing a level of congestion at a compression/deduplication layer of a storage device with a lower congestion limit. The compression/deduplication layer is configured for data compression and/or data deduplication of a data packet prior to storing data of the data packet and the data packet is received from a computing device using TCP. The program code is configured to be executable by a processor to preform operations that include, in response to the level of congestion exceeding the lower congestion limit, marking as congested, in a flow table, a data flow between the computing device and the storage device, and the flow table is shared between the compression/deduplication layer and a TCP layer of the storage device. In response to the level of congestion exceeding an upper congestion limit, the program code is configured to be executable by a processor to preform operations that include determining if the data packet meets a packet discard policy and discarding the data packet in response to determining that the data packet meets the packet discard policy.

FIG. 1 is a schematic block diagram illustrating one embodiment of a system 100 for storage device compression/deduplication layer congestion control. The system 100 includes a storage device 102, compute nodes 104a-104n (collectively or generically "104"), a computer network 106, clients 108a-108n (collectively or generically "108"), a TCP layer 110 in the storage device 102 and compute nodes 104, a remote storage protocol layer 112 and a compression/deduplication layer 114 in the storage device 102, a physical storage device 116 in the storage device 102, and virtual machines 118 in the compute nodes 104, which are described below.

The system 100 includes a storage device 102 that includes a TCP layer 110, a remote storage protocol layer 112 and a compression/deduplication layer 114 along with a physical storage device 116. The TCP layer 110 receives data packets from the compute nodes 104 or other computing device. The TCP layer 110 passes data packets to a remote storage protocol layer 112 that unencapsulates storage commands and data to be stored transmitted from the compute nodes 104 or other computing device. The remote storage protocol layer 112 is configured to allow storage commands and associated data from device to device where the storage device 102 is not located in a computing device.

In some embodiments, the remote storage device protocol layer 112 is implemented using Internet Small Computer System Interface ("iSCSI"). iSCSI is an Internet-based storage networking standard that allows linking of computing devices, such as compute nodes 104, and storage devices, such as the storage device 102 of FIG. 1. iSCSI provides block-level access to storage devices with Small Computer System Interface ("SCSI") commands over a network. The network may use just TCP or may use Internet Protocol ("IP") and the network may be a TCP/IP network. In some embodiments, iSCSI facilitates data transfers to storage devices over intranets and allows data management over long distances. iSCSI can be used to transmit data over LANs, WANs, the Internet, or other TCP or TCP/IP-based networks and can enable location-independent data storage and retrieval. iSCSI is a storage area network ("SAN") protocol that allows use of storage arrays while providing clients 104 with the illusion of locally attached SCSI disks.

While the remote storage protocol layer 112 may be implemented in iSCSI along with the TCP layer 110, the embodiments described herein may use other protocols for the remote storage protocol layer 112. The remote storage protocol layer 112 may include any protocol that may be used with TCP to allow for remote storage and for storage commands and associated data to be transmitted from clients 104 to the remote storage device 102.

The remote storage protocol layer 112 passes data packets of storage commands and data to the compression/deduplication layer 114. The compression/deduplication layer 114 prepares data from received data packets to be stored on the physical storage device 116. The compression/deduplication layer 114, in some embodiments, converts virtual addresses to physical addresses of the physical storage device 116. The compression/deduplication layer 114 typically compresses data for more efficient storage. The compression/deduplication layer 114 also may include a deduplication function that reduces duplication of data blocks stored on the physical storage device 116. In some embodiments, the compression/deduplication layer 114 includes a compression function that compresses data in a received data packet before storage on the physical storage device 116. In other embodiments, the compression/deduplication layer 114 includes a compression function and/or a deduplication function.

Often the compression and deduplication functions are central processing unit ("CPU") and memory intensive and can cause congestion. For example, the compression and deduplication functions may cause the CPU of the storage device 102 to be overloaded. In another example, the compression and deduplication functions may utilize a lot of memory, which causes congestion. In another example, a high number of requests per second of storage commands may cause congestion. Congestion of the storage device 102 can slow data flow and cause dropped data packets. Where the TCP data packet transmission window is too large, congestion of the storage device 102 makes data storage inefficient and can cause data loss. Monitoring congestion of the storage device 102 and using congestion monitoring to manage the size of the data transmission window for TCP beneficially increases data storage efficiency and reliability.

In some embodiments, the compression/deduplication layer 114 is implemented using the Virtual Data Optimizer ("VDO") protocol. VDO is a device mapping module that provides data reduction capabilities to the Linux block storage stack and is a feature of Red Hat Enterprise Linux ("RHEL") and can be used in datacenters and cloud-based environments. VDO provides zero-block elimination to remove blocks that only contain zeros. VDO also provides a deduplication function by eliminating duplicate blocks of data. VDO uses a compression function to compress stored data. In other embodiments, the compression/deduplication layer 114 is implemented using SoftNAS® by Buurst, Inc., DRBD by Linbit®, or any other block level compression and/or deduplication layer that receives data received at a TCP layer 110.

The physical storage device 116 includes non-volatile storage. In some embodiments, the physical storage device 116 is a single device. In other embodiments, the physical storage device 116 is multiple devices combined in a Redundant Array of Independent Disks ("RAID") or other distributed storage array. In some embodiments, the physical storage device 116 is a hard disk drive ("HDD"). In other embodiments, the physical storage device 116 is a solid-state drive ("SSD"). The solid-state storage device may be a flash drive, a NAND flash drive, a dynamic random-access memory ("DRAM") drive, or the like. An SSD may be a serial AT attachment ("SATA") drive, a Peripheral Component Interface Express ("PCIe") drive, an M.2 drive, a Non-Volatile Memory Express ("NVMe") drive, or the like. One of skill in the art will recognize other storage devices suitable for the physical storage device 116.

A compute node 104 is a computing device that serves as a client for the storage device 102 for sending storage commands and data to be stored. In some embodiments, compute nodes 104 are servers in a rack connected to one or more storage devices 102 and to clients 108. In some embodiments, compute nodes 104 are in a datacenter. In some embodiments, compute nodes 104 are used to run workloads for clients 108. For example, the compute nodes 104 may be part of a cloud solution. Workloads running on compute nodes 104 store and retrieve data from storage devices 102. While compute nodes 104 are depicted, any computing device that stores and retrieves data on a remote storage device using TCP may be used with the embodiments described herein. A compute node 104 may be a rack-mounted server, a desktop computer, a mainframe computer, or any other computing device capable of being connected remotely to the storage device 102. Note that while a single storage device 102 is depicted, typically compute nodes 104 are connected to a plurality of storage devices 102 and the depicted storage device 102 is representative of any number of storage devices 102.

In some embodiments, compute nodes 104 run virtual machines 118. Virtual machines 118 are separated for security reasons and typically each run their own instance of an operating system. In other embodiments, the compute nodes 104 run containers (not shown), which are light-weight versions of virtual machines 118. Containers 118 are a virtualization solution that are more agile and include faster resource provisioning than virtual machines 118. Both virtual machines 118 and containers have advantages and disadvantages. Both virtual machines 118 and containers run workloads and store and retrieve data from the storage device 102.

Clients 108 are computing devices in communication with the compute nodes 104 over a computer network 106. The computer network 106 may include a LAN, a WAN, a Fiber Channel network, the Internet, cellular network, a wireless connection, or any combination thereof. The computer network 106 includes any combination of cables, switches, routers, servers, wireless access points, and the like. In some embodiments, the clients 108 are connected directly to the storage device 102 and transmit and retrieve data using TCP and may use TCP/IP. A client 108 may be a desktop computer, a workstation, a mobile computing device, a cellphone, a tablet computer, or any other computing device capable of communicating with the compute nodes 104 and/or storage device 102.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Figure 2:
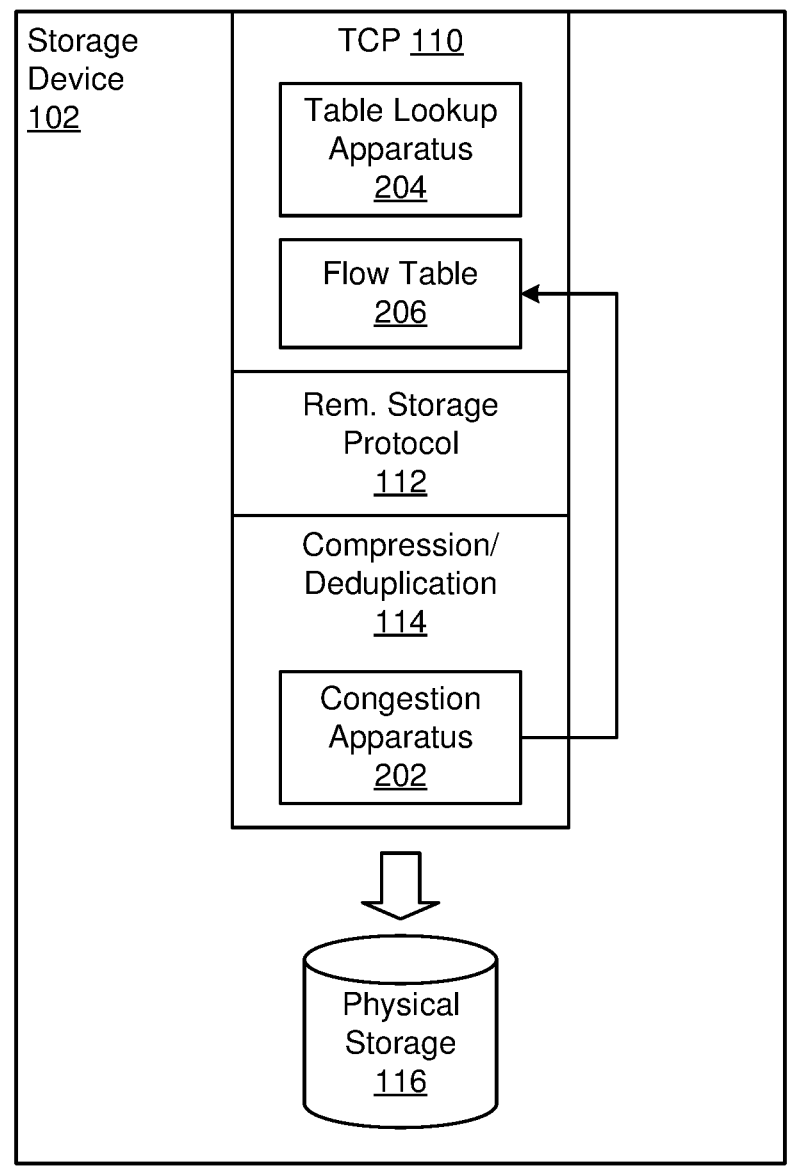
FIG. 2 is a schematic block diagram illustrating one embodiment of a more detailed view of the storage device of FIG. 1.

FIG. 2 is a schematic block diagram illustrating one embodiment 200 of a more detailed view of the storage device 102 of FIG. 1. The storage device 102 of the embodiment 200 of FIG. 2 is substantially similar to the storage device 102 of FIG. 1. The storage device 102 depicted in FIG. 2 includes a compression/deduplication layer 114 with a congestion apparatus 202 and a TCP layer 110 with a table lookup apparatus 204 and a flow table 206, which are described below.

The congestion apparatus 202 is configured to determine congestion of the compression/deduplication layer 114 and to either update entries in the flow table 206 based on congestion of the compression/deduplication layer 114 or to drop packets when there is high congestion of the compression/deduplication layer 114. The table lookup apparatus 204 receives response data packets, looks at an entry in the flow table 206 for the data flow between a source (for example, compute node 104a) and the storage device 102 to see if the entry is marked congested or not. If the entry for the data flow is marked congested, the table lookup apparatus 204 marks the response data packets with a congestion indicator and the TCP layer 110 transmits the response data packet to the source of the data flow (compute node 104a).

Where data packets are dropped by the congestion apparatus 202, the data packets are not processed so no response data packet is sent to the source device and the source device (e.g. compute node 104a) eventually reaches a timeout with regard to the data flow and typically attempts to re-transmit the data packets. The TCP layer 110 in the source device (compute node 104a), in response to either receiving response data packets marked congested or in response to a timeout with regard to the data flow, reduces the size of the current data packet transmission window, which in turn reduces congestion of the compression/deduplication layer 114 and storage device 102. Thus, the compression/deduplication layer 114, through the congestion apparatus 202, interacts with the TCP layer 110 to provide a mechanism to reduce congestion in the storage device 102.

Figure 3:
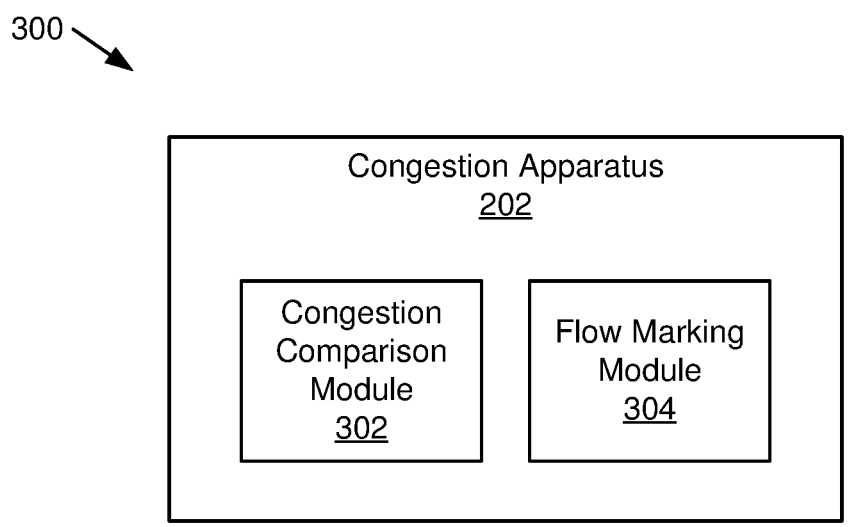
FIG. 3 is a schematic block diagram illustrating one embodiment of a congestion apparatus for storage device compression/deduplication layer congestion control.

FIG. 3 is a schematic block diagram illustrating one embodiment 300 of a congestion apparatus 202 for storage device compression/deduplication layer congestion control. The congestion apparatus 202 includes a congestion comparison module 302 and a flow marking module 304, which are described below. In some embodiments, the congestion apparatus 202 is implemented with program code stored on non-volatile computer readable storage media, such as the physical storage device 116. The program code is executable on a processor, such as a CPU of the storage device. In other embodiments, the congestion apparatus 202 is implemented using a programmable hardware device, such as an FPGA. In other embodiments, all or a portion of the congestion apparatus 202 is implemented using hardware circuits. For example, the congestion apparatus 202 may be implemented using an ASIC or other hardware circuits. One of skill in the art will recognize other ways to implement the congestion apparatus 202.

The congestion apparatus 202 includes a congestion comparison module 302 configured to compare a level of congestion at the compression/deduplication layer 114 of a storage device 102 with a lower congestion limit. The compression/deduplication layer 114 is configured, in some embodiments for data compression and data deduplication of a data packet prior to storing data of the data packet in the physical storage device 116. In some embodiments, the compression/deduplication layer is substantially similar to the compression/deduplication layer 114 described above in relation to the storage devices 102 of FIGS. 1 and 2. The data packet is received from a computing device, such as a compute node 104, using TCP. In other embodiments, the data packet is received from the computing device using TCP/IP.

In some embodiments, the level of congestion is based on a level of utilization of a processor (e.g. CPU) of the storage device 102. For example, the level of congestion may be 70% of utilization of the processor of the storage device 102 and a lower congestion limit may be 60% utilization of the processor so the compression/deduplication layer 114 is congested. In other embodiments, the level of congestion is based on an amount of memory utilization of memory of the storage device 102. The memory, in some embodiments, includes volatile storage such as RAM. For example, the level of congestion may be 60% utilization of the memory of the storage device 102 and a lower congestion limit may be 65% of utilization of the memory so the compression/deduplication layer 114 may not be congested.

In another embodiment, the level of congestion is related to a number of storage requests per second received by the compression/deduplication layer 114 and/or storage device 102. For example, the level of congestion may be 600 storage requests per second and a lower compression limit may be 400 storage requests per second so the compression/deduplication layer 114 is congested. In other embodiments, the level of congestion is based on some other metric that affects performance of the compression/deduplication layer 114. In other embodiments, the level of congestion is set by an algorithm that considers more than one of the level of congestion of the processor, the number of storage requests, the amount of memory utilization, etc. For example, the congestion apparatus 202 may compare any and/or all levels of congestion with and appropriate a lower congestion limit for each level of congestion. One of skill in the art will recognize other ways for the congestion comparison module 302 to compare a level of congestion at the compression/deduplication layer 114 with one or more lower congestion limits.

The congestion apparatus 202 includes a flow marking module 304 configured to, in response to the level of congestion exceeding the lower congestion limit, mark as congested, in a flow table 206, a data flow between the computing device (e.g. compute node 104a) and the storage device 102. The flow table 206 is shared between the compression/deduplication layer 114 and the TCP layer 110 of the storage device 102.

In some embodiments, the flow table 206 includes entries representing a data flow between a source and a destination where the source is a computing device, such as a compute node 104 and the destination is the storage device 102. In some embodiments, an entry for a data flow in the flow table 206 includes a source address, a source port, a destination address, a destination port, and a congestion indicator. The source address and the destination address, in some embodiments, is an IP address. In other embodiments, the source and destination addresses are in a different format. In some embodiments, the flow table 206 does not include a destination address for each data flow entry in the flow table 206 because the destination address is simply the address of the storage device 102 in every instance.

In some embodiments, the source port and the destination port are the ports on the source device and the destination device that are connected and where data for the data flow is transmitted. In some embodiments, the source device and destination device (storage device 102) are connected with one or more link aggregation groups ("LAGs") or multi-chassis LAGs ("MLAGs"). For example, the source and storage device 102 may include redundant connections or a switch or redundant switches (not shown) between the source device and storage device 102 and ports of the storage device 102 may be grouped in a LAG or MLAG so that the source port or destination port are listed in the flow table 206 as virtual ports. One of skill in the art will recognize ways to designate a source port and a destination port of a data flow.

In some embodiments, the congestion indicator is bit that may be set or cleared to indicate congestion or no congestion. For example, a congestion indicator of a data flow entry in the flow table 206 may be a bit and the flow marking module 304 may set the congestion bit for the data flow to indicate congestion and may clear the congestion bit to indicate no congestion for the data flow. In other embodiments, the congestion indicator in the flow table 206 is marked in some other way, such as a byte, a flag, etc.

The flow table 206 may be a table, a database, a list, or any suitable data structure that can be accessed by the compression/deduplication layer 114 and/or the congestion apparatus 202 as well as the TCP layer 110 and/or the table lookup apparatus 204. The flow table 206 is depicted in the TCP layer 110 but may be located in the compression/deduplication layer 114, external to a layer, in memory and/or in non-volatile storage, including the physical storage device 116 of the storage device 102.

Figure 4:
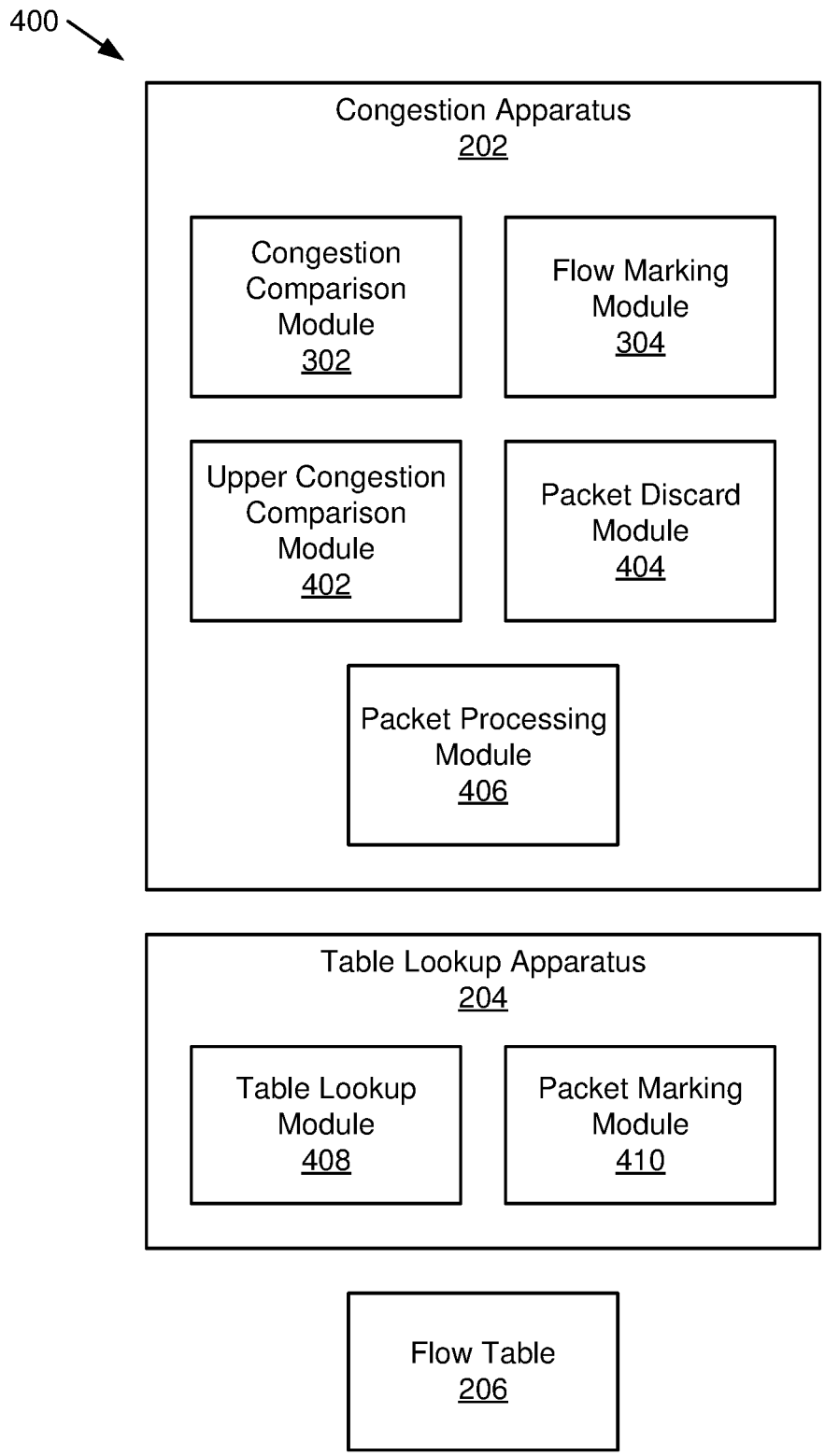
FIG. 4 is a schematic block diagram illustrating another embodiment of a congestion apparatus, a table lookup apparatus and a flow table for storage device compression/deduplication layer congestion control.

FIG. 4 is a schematic block diagram illustrating another embodiment 400 of a congestion apparatus 202, a table lookup apparatus 204 and a flow table 206 for storage device compression/deduplication layer congestion control. The congestion apparatus 202 includes a congestion comparison module 302 and a flow marking module 304 which are substantially similar to those described above in relation to the congestion apparatus 202 of FIG. 3. The congestion apparatus 202 includes an upper congestion comparison module 402, a packet discard module 404, and/or a packet processing module 406, which are described below. The table lookup apparatus 204 includes a table lookup module 408 and a packet marking module 410, which are described below. The flow table 206 is substantially similar to the flow table 206 described above in relation to the embodiment 200 of FIG. 2. The congestion apparatus 202 and table lookup apparatus 204 may be implemented in similar ways as the congestion apparatus 202 of FIG. 3.

The congestion apparatus 202, in some embodiments, includes an upper congestion comparison module 402 configured to, in response to the level of congestion exceeding an upper congestion limit, determine if the data packet meets a packet discard policy, and a packet discard module 404 is configured to discard the data packet in response to determining that the data packet meets the packet discard policy.

In some embodiments, the upper congestion comparison module 402 works in conjunction with the congestion comparison module 302 where the upper congestion comparison module 402 and the congestion comparison module 302 both compare the level of congestion against the lower congestion limit and the upper congestion limit. The lower congestion limit is set at a lower level of congestion than the upper congestion limit. Fo example, where the level of congestion is based on a level of congestion of the processor, which may be between 0 and 100%, the lower congestion limit may be 60% and the upper congestion limit may be 95%. One of skill in the art will recognize appropriate values for the lower congestion limit and the upper congestion limit for various measurements of congestion. Discarding a data packet, as used herein, includes not processing the data packet and allowing the data packet to be moved out of registers, memory, queues, etc. without any action being taken by the storage device 102 to execute a storage command of the data packet, to store in non-volatile memory the data of the data packet, etc.

The packet discard policy, in some embodiments, is simply that the level of congestion is above an upper congestion limit. In other embodiments, the packet discard policy is more complex and is based on other factors, such as type of data being stored, data packet priority, data flow priority, current hardware capabilities, etc. In some examples, the upper congestion comparison module 402 uses different upper congestion limits based on different packet priority levels, which helps to achieve quality of service prioritization. In other embodiments, the packet discard policy is based on other current hardware capabilities, such as, for example, a combination of memory utilization, processor utilization, storage request rate, etc. In some embodiments, the packet discard policy is the Weighted Random Early Detection ("WRED") policy. WRED is primarily a queueing discipline for a network scheduler suited for congestion avoidance. In the embodiments described herein, WRED is adapted for use with a storage device 102 and the compression/deduplication layer 114. In other embodiments, other packet discard policies are used. One of skill in the art will recognize other suitable packet discard policies.

The congestion apparatus 202, in some embodiments, includes a packet processing module 406 configured to process the data packet for storage in response to determining that the level of congestion is below the lower congestion limit. Thus, when the level of congestion is low the data packets are processed normally. The packet processing module 406 is also configured to process the data packet for storage in response to marking as congested the data flow in the flow table 206 and/or determining that the level of congestion is below the upper congestion limit. When there is congestion above the lower congestion limit but below the upper congestion limit, the flow marking module 304 marks the data flow in the flow table 206 and then the packet processing module 406 processes the data packet for storage.

The packet processing module 406 is also configured to process the data packet for storage in response to determining that the data packet does not meet the packet discard policy. For example, where the upper congestion comparison module 402 determines that the level of congestion is above the upper congestion limit and the packet discard module 404 determines that the packet discard policy has not been met, the packet processing module 406 then processes the data packet for storage.

The table lookup apparatus 204 operates in conjunction with the TCP layer 110 of the storage device 102. In some embodiments, the TCP layer 110 of the storage device 102 is modified to use the flow table 206 to determine packet marking instead of other means, such as receiving a message from a router that the router is congested. The table lookup apparatus 204 includes a table lookup module 408 configured to determine if a data flow entry in the flow table 206 is marked as congested in response to receiving a response data packet for the data flow.

A response data packet for a data flow is a data packet created by the storage device 102 and sent back to the source device of the data flow in response to executing a storage command and/or storing data received from the source device. For example, where a first compute node 104*a* is the source device of a data flow and sends a storage command and data to be stored in the storage device, sends a read data command, etc. Where the storage device 102 receives the data packets of the data flow associated with the storage command and/or data and the packet processing module 406 processes the received data packets, the storage device 102 creates a response, such as an acknowledgement message, requested data, or some other response to the received storage command and/or data to be sent to the first compute node 104*a*. The storage device 102 breaks the response into response data packets, which are sent up a stack to the TCP layer 110 of the storage device 102. The table lookup module 408 receives a response data packet for the data flow and accesses an entry for the data flow in the flow table 206 and determines if the entry is marked congested or not.

The table lookup apparatus 204 includes a packet marking module 410 configured to mark a response data packet for a data flow with a congestion indicator in response to the table lookup module 408 determining that the data flow is marked congested in the data flow entry of the flow table 206. The TCP layer 110 of the storage device 102 then transmits the marked response data packet to the source device, such as the first compute node 104*a*. The congestion indicator, in some embodiments, is a bit in a header of the response data packet. For example, the congestion indicator bit, in some embodiments, is set to indicate congestion and is cleared to indicate no congestion. In other embodiments, the congestion indicator is some other bit, byte, sequence, header section, etc. in the response data packet. One of skill in the art will recognize other forms of a congestion indicator.

In some embodiments, the TCP layers 110 the source device and storage device 102 Explicit Congestion Notification ("ECN") enabled and the packet marking module 410 uses ECN to mark the response data packets. ECN is an extension to the Internet Protocol and to the TCP. ECN allows end-to-end notification of network congestion without dropping packets and instead relies on marked response data packets to signal to the TCP layer 110 in the source device to reduce the size of a current a data packet transmission window. Where the packet marking module 410 uses ECN, the congestion indicator may include two flags in the TCP header of the response data packet. For IP, the congestion indicator may be the two least significant bits of a traffic class field in an IPv4 or IPv6 header of the response data packet. In other embodiments, another packet marking protocol is used instead of ECN, such as Backward ECN ("BECN").

Advantageously, the congestion apparatus 202 and the table lookup apparatus 204 provide a mechanism to reduce congestion of the compression/deduplication layer 114 of a storage device 102 where data packets are received using TCP or TCP/IP. The congestion apparatus 202 and the table lookup apparatus 204 create a novel approach to mark response data packets or dropping data packets based on congestion at the compression/deduplication layer 114 of a storage device 102.

Figure 5:
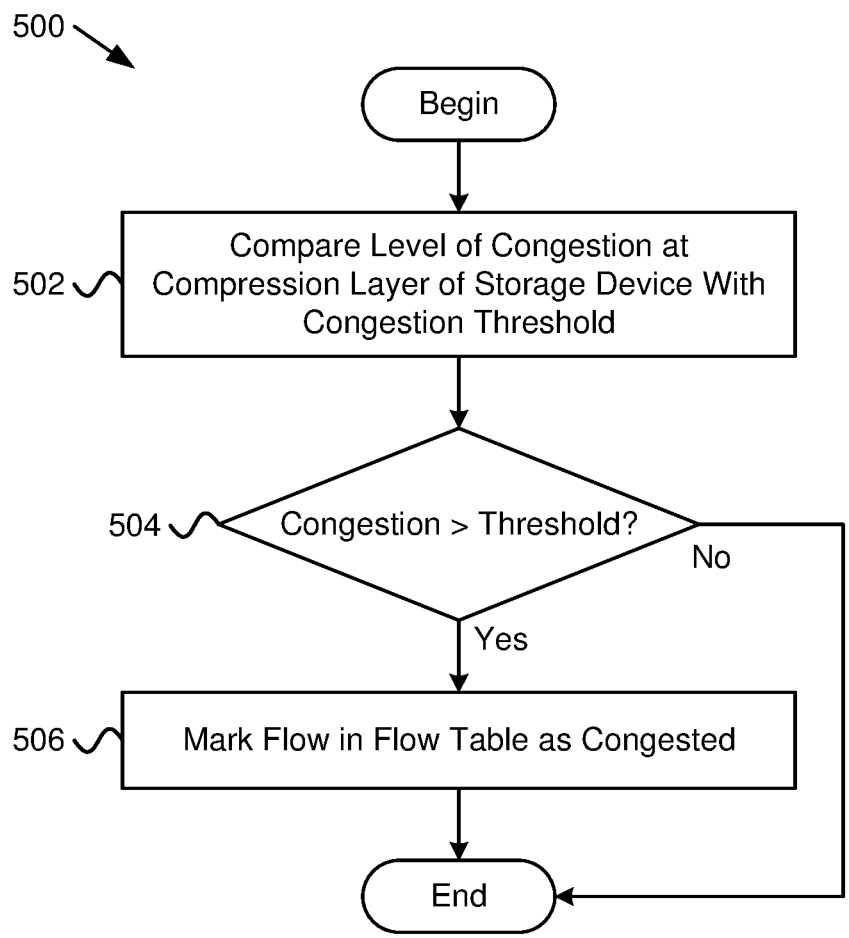
FIG. 5 is a schematic flow chart diagram illustrating one embodiment of a method for storage device compression/deduplication layer congestion control.

FIG. 5 is a schematic flow chart diagram illustrating one embodiment of a method 500 for storage device compression/deduplication layer congestion control. The method 500 begins and compares 502 a level of congestion at a compression/deduplication layer 114 of a storage device 102 with a lower congestion limit. The compression/deduplication layer 114 is configured for data compression and/or data deduplication of a data packet prior to storing data of the data packet. The data packet is received from a computing device, such as a compute node 104, using TCP. The method 500 determines 504 if the level of congestion exceeds a lower congestion limit. If the method 500 determines 504 that the level of congestion exceeds the lower congestion limit, the method 500 marks 506 as congested, in a flow table 206, a data flow between the computing device (e.g. 104) and the storage device 102. The flow table 206 is shared between the compression/deduplication layer 114 and a TCP layer 110 of the storage device 102. In various embodiments, all or a portion of the method 500 is implemented using one or more of the congestion comparison module 302, the flow marking module 304 and the flow table 206.

Figure 6:
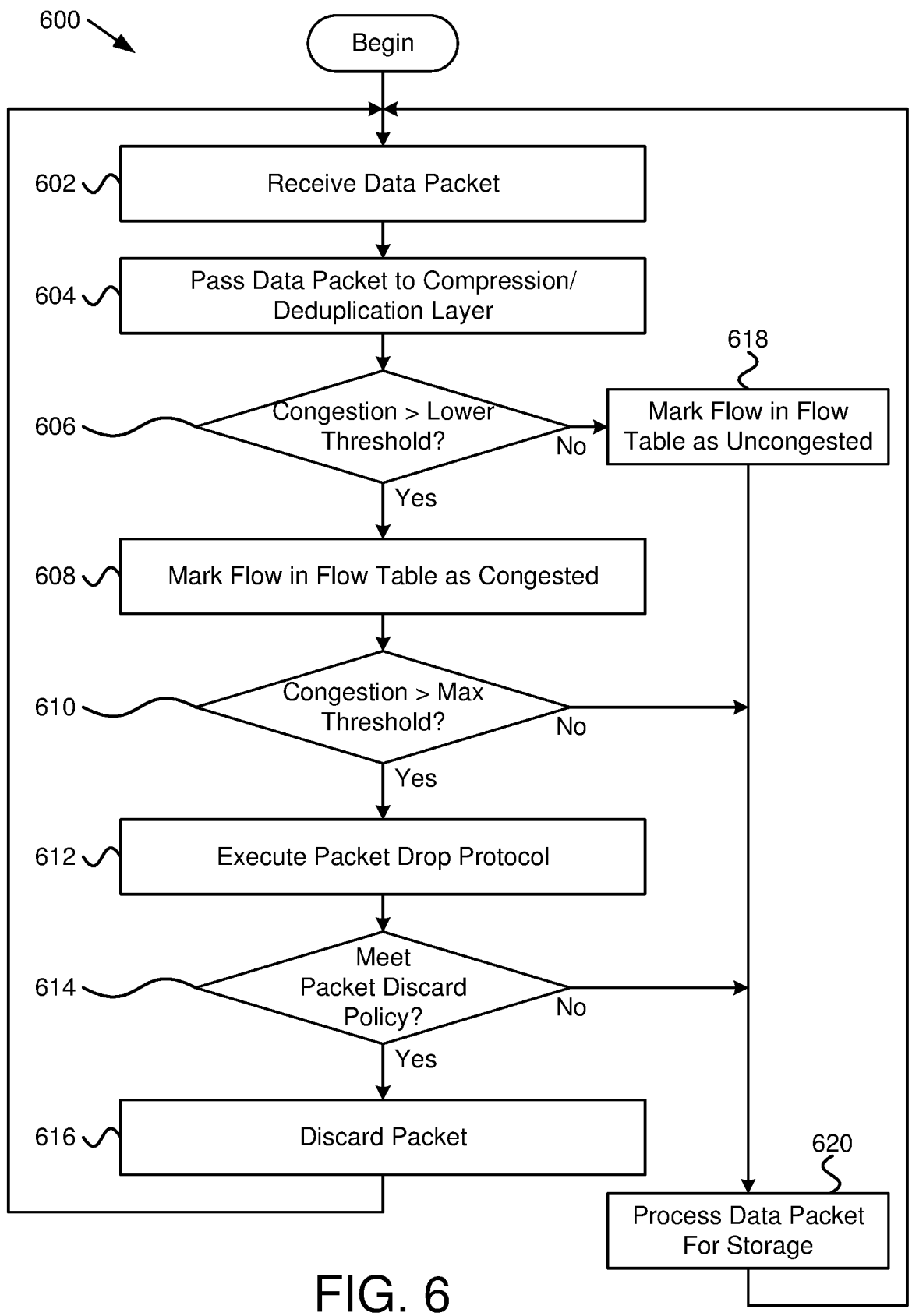
FIG. 6 is a schematic flow chart diagram illustrating another embodiment of a method for storage device compression/deduplication layer congestion control.

FIG. 6 is a schematic flow chart diagram illustrating another embodiment of a method 600 for storage device compression/deduplication layer congestion control. The method 600 begins and receives 602 a data packet at a TCP layer 110 of a storage device 102 and passes 604 the data packet to a compression/deduplication layer 114 of the storage device 102. In some embodiments, the data packet passes through a remote storage protocol layer 112 of the storage device 102, such as iSCSI, before reaching the compression/deduplication layer 114. The method 600 determines 606 if a level of congestion of the compression/deduplication layer 114 of the storage device 102 exceeds a lower congestion limit.

If the method 600 determines 606 that the level of congestion exceeds the lower congestion limit, the method 600 marks 608 as congested, in a flow table 206, a data flow between the computing device, such as a compute node 104 or a client 108, and the storage device 102. The flow table 206 is shared between the compression/deduplication layer 114 and a TCP layer 110 of the storage device 102. The method 600 determines 610 if the level of congestion exceeds an upper congestion limit. If the method 600 determines 610 that the level of congestion exceeds an upper congestion limit, the method 600 executes 612 a drop packet protocol, such as WRED, and determines 614 if the data packet meets a packet discard policy. If the method 600 determines 614 the that the data packet meets the packet discard policy, the method 600 discards 616 the data packet and returns and receives 602 another data packet.

If the method 600 determines 606 that the level of congestion does not exceed the lower congestion limit, the method 600 marks 618 as not congested, in the flow table 206, the data flow between the computing device and the storage device 102 and processes 620 the data packet for storage and returns and receives 602 another data packet. If the method 600 determines 610 that the level of congestion does not exceed the upper congestion limit, the method 600 processes 620 the data packet for storage and returns and receives 602 another data packet. Also, if the method 600 determines 614 the that the data packet does not meet the packet discard policy, the method 600 processes 620 the data packet for storage and returns and receives 602 another data packet. In various embodiments, all or a portion of the method 600 is implemented using one or more of the congestion comparison module 302, the flow marking module 304, the flow table 206, the upper congestion comparison module 402, the packet discard module 404, and the packet processing module 406.

Figure 7:
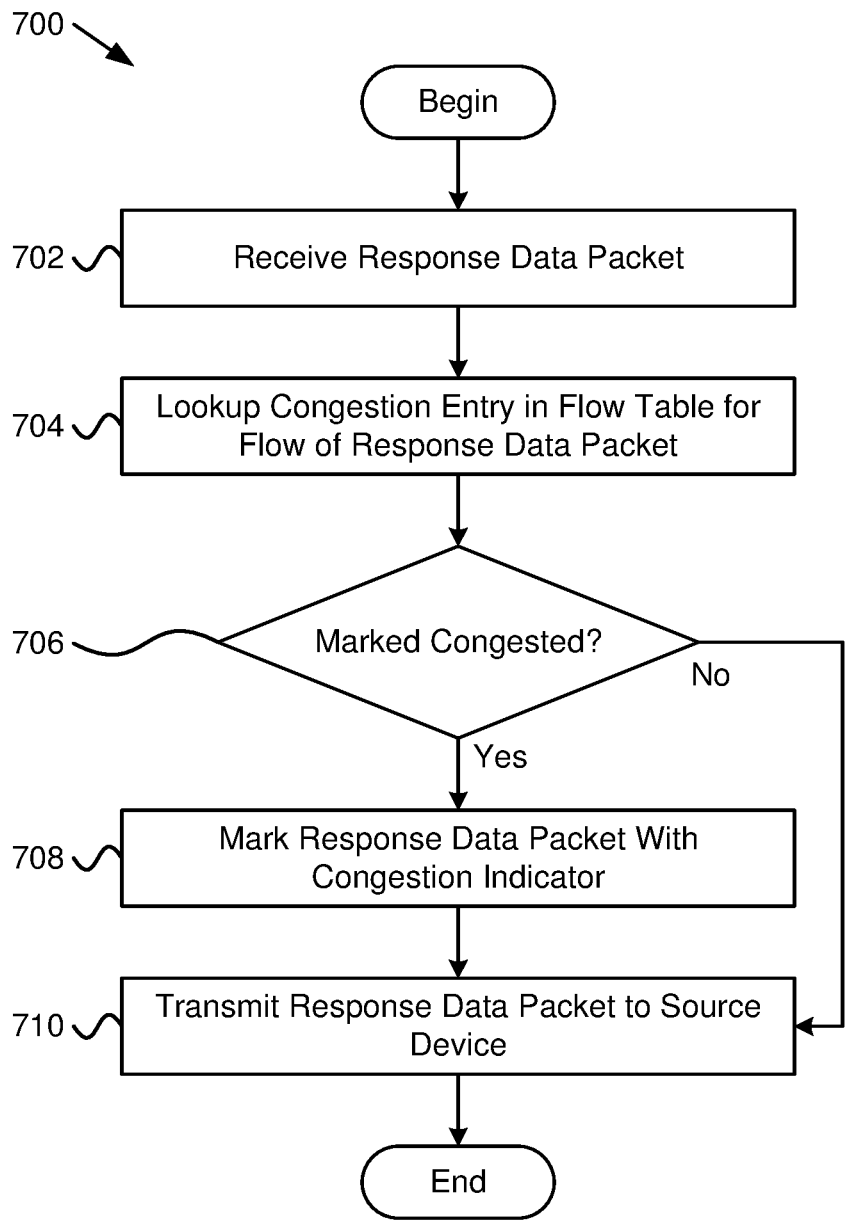
FIG. 7 is a schematic flow chart diagram illustrating one embodiment of a method for flow table lookup and packet marking for storage device compression/deduplication layer congestion control.

FIG. 7 is a schematic flow chart diagram illustrating one embodiment of a method 700 for flow table lookup and packet marking for storage device compression/deduplication layer congestion control. The method 700 begins and receives 702 a response data packet and looks up 704 the congestion entry of the data flow corresponding to the response data packet in the flow table 206 and determines 706 if the congestion entry for the data flow is marked as congested. If the method 700 determines 706 that the congestion entry for the data flow is marked as congested, the method 700 marks 708 the response data packet with a congestion indicator and transmits 710 the response data packet to the source device, such as to a compute node 104, and the method 700 ends. For example, the method 700 may use ECN to mark the response data packets. If the method 700 determines 706 that the congestion entry for the data flow is marked as not congested, the method 700 transmits 710 the response data packet to the source device, such as to a compute node 104, and the method 700 ends. In various embodiments, all or a portion of the method 700 is implemented using one or more of the table lookup module 408, the packet marking module 410, the TCP layer 110 of the storage device 102 and the flow table 206.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   comparing a level of congestion at a compression/deduplication layer of a storage device with a lower congestion limit, the compression/deduplication layer configured for data compression and/or data deduplication of a data packet prior to storing data of the data packet on the storage device, the level of congestion regarding an amount of congestion at the compression/deduplication layer, the data packet received from a computing device using transmission control protocol ("TCP") and directed to be stored on the storage device by the computing device; and
   in response to the level of congestion exceeding the lower congestion limit, marking as congested, in a flow table, a data flow between the computing device and the storage device, the flow table shared between the compression/deduplication layer and a TCP layer of the storage device.

2. The method of claim 1, further comprising:
   in response to the level of congestion exceeding an upper congestion limit, determining if the data packet meets a packet discard policy; and
   discarding the data packet in response to determining that the data packet meets the packet discard policy.

3. The method of claim 2, further comprising processing the data packet for storage in response to one of:
   determining that the level of congestion is below the lower congestion limit;
   in response to marking as congested the data flow in the flow table and determining that the level of congestion is below the upper congestion limit; and
   in response to determining that the data packet does not meet the packet discard policy.

4. The method of claim 2, wherein the packet discard policy is a Weighted Random Early Detection ("WRED") protocol.

5. The method of claim 1, wherein the compression/deduplication layer is a virtual data optimizer ("VDO") layer.

6. The method of claim 1, wherein the level of congestion comprises one or more of:
   a level of congestion of a processor of the storage device;
   a number of storage requests per second; and
   an amount of memory utilization of memory of the storage device.

7. The method of claim 1, wherein the compression/deduplication layer receives the data packet from a data storage protocol layer, wherein the data storage protocol layer receives the data packet from the TCP layer of the storage device, and wherein the data storage protocol layer processes storage device commands to physical storage in the storage device.

8. The method of claim 7, wherein the data storage protocol layer uses an Internet Small Computer Systems Interface ("iSCSI") protocol.

9. The method of claim 1, wherein in response to the data flow in the flow table being marked as congested, further comprising marking a response data packet with a congestion indicator, the response data packet being sent to the computing device and comprising a response to data of the data packet received from the computing device.

10. The method of claim 9, wherein marking the response data packet with a congestion indicator uses Explicit Congestion Notification ("ECN") protocol.

11. The method of claim 1, wherein the flow table comprises a data flow for each computing device connected to the storage device, each data flow comprising an internet protocol ("IP") address and a port for the computing device, an IP address and a port for the storage device, and an indication of whether or not the data flow is congested.

12. An apparatus comprising:
   a processor; and
   a memory that stores program code executable by the processor to:
      compare a level of congestion at a compression/deduplication layer of a storage device with a lower congestion limit, the compression/deduplication layer configured for data compression and/or data deduplication of a data packet prior to storing data of the data packet on the storage device, the level of congestion regarding an amount of congestion at the compression/deduplication layer, the data packet received from a computing device using transmission control protocol ("TCP") and directed to be stored on the storage device by the computing device; and
      in response to the level of congestion exceeding the lower congestion limit, mark as congested, in a flow table, a data flow between the computing device and the storage device, the flow table shared between the compression/deduplication layer and a TCP layer of the storage device.

13. The apparatus of claim 12, wherein the program code is further executable by the processor to:
   in response to the level of congestion exceeding an upper congestion limit, determining if the data packet meets a packet discard policy; and
   discarding the data packet in response to determining that the data packet meets the packet discard policy.

14. The apparatus of claim 13, wherein the program code is further executable by the processor to process the data packet for storage in response to:
   determine that the level of congestion is below the lower congestion limit;
   in response to marking as congested the data flow in the flow table and determining that the level of congestion is below the upper congestion limit; and/or
   in response to determining that the data packet does not meet the packet discard policy.

15. The apparatus of claim 13, wherein the packet discard policy is a Weighted Random Early Detection ("WRED") protocol.

16. The apparatus of claim 12, wherein the compression/deduplication layer is a virtual data optimizer ("VDO") layer.

17. The apparatus of claim 12, wherein the level of congestion comprises one or more of:
- a level of congestion of a processor of the storage device;
- a number of storage requests per second; and
- an amount of memory utilization of memory of the storage device.

18. The apparatus of claim 12, wherein in response to the data flow in the flow table being marked as congested, further comprising program code executable by the processor to mark a response data packet with a congestion indicator, the response data packet being sent to the computing device and comprising a response to data of the data packet received from the computing device.

19. The apparatus of claim 12, wherein the compression/deduplication layer receives the data packet from a data storage protocol layer, wherein the data storage protocol layer receives the data packet from the TCP layer of the storage device, and wherein the data storage protocol layer processes storage device commands to physical storage in the storage device, wherein the data storage protocol layer uses an Internet Small Computer Systems Interface ("iSCSI") protocol.

20. A program product comprising a non-transitory computer readable storage medium storing program code, the program code being configured to be executable by a processor to perform operations comprising:
- comparing a level of congestion at a compression/deduplication layer of a storage device with a lower congestion limit, the compression/deduplication layer configured for data compression and/or data deduplication of a data packet prior to storing data of the data packet on the storage device, the level of congestion regarding an amount of congestion at the compression/deduplication layer, the data packet received from a computing device using transmission control protocol ("TCP") and directed to be stored on the storage device by the computing device;
- in response to the level of congestion exceeding the lower congestion limit, marking as congested, in a flow table, a data flow between the computing device and the storage device, the flow table shared between the compression/deduplication layer and a TCP layer of the storage device;
- in response to the level of congestion exceeding an upper congestion limit, determining if the data packet meets a packet discard policy; and
- discarding the data packet in response to determining that the data packet meets the packet discard policy.

* * * * *